US 11,256,157 B2

(12) United States Patent
Druon et al.

(10) Patent No.: US 11,256,157 B2
(45) Date of Patent: Feb. 22, 2022

(54) MULTIPHOTONIC MICROSCOPY METHOD AND DEVICE

(71) Applicants: CENTRE NATIONAL DE LA RECHERCHE SCIENTIFIQUE, Paris (FR); ECOLE POLYTECHNIQUE, Palaiseau (FR)

(72) Inventors: Frédéric Druon, Orsay (FR); Marc Hanna, Limours (FR); Philippe Rigaud, Antony (FR); Khmaies Guesmi, Villebon sur Yvette (FR); Emmanuel Beaurepaire, Palaiseau (FR); Willy Supatto, Gif-sur-Yvette (FR); Pierre Mahou, Massy (FR); Lamiae Abdeladim, Paris (FR)

(73) Assignees: CENTRE NATIONAL DE LA RECHERCHE SCIENTIFIQUE, Paris (FR); ECOLE POLYTECHNIQUE, Palaiseau (FR)

(*) Notice: Subject to any disclaimer, the term of this patent is extended or adjusted under 35 U.S.C. 154(b) by 234 days.

(21) Appl. No.: 16/620,422

(22) PCT Filed: Jun. 5, 2018

(86) PCT No.: PCT/EP2018/064781
§ 371 (c)(1),
(2) Date: Dec. 6, 2019

(87) PCT Pub. No.: WO2018/224503
PCT Pub. Date: Dec. 13, 2018

(65) Prior Publication Data
US 2020/0088642 A1    Mar. 19, 2020

(30) Foreign Application Priority Data
Jun. 9, 2017    (FR) ...................................... 1755167

(51) Int. Cl.
*G02F 1/39* (2006.01)
*G01N 21/64* (2006.01)
(Continued)

(52) U.S. Cl.
CPC .............. *G02F 1/39* (2013.01); *G02F 1/3528* (2021.01); *G02F 1/3532* (2013.01);
(Continued)

(58) Field of Classification Search
CPC .... G02F 1/3501; G02F 1/3528; G02F 1/3532; G02F 1/3544; G02F 1/37; G02F 1/39;
(Continued)

(56) References Cited

U.S. PATENT DOCUMENTS 9,244,332 B1 *   1/2016  Calendron ............ H01S 3/0092
10,042,232 B2 *  8/2018  Beutler ................. G02F 1/3544
(Continued)

FOREIGN PATENT DOCUMENTS

FR       3 013 857 A1     5/2015

OTHER PUBLICATIONS

International Search Report and Written Opinion for Application No. PCT/EP2018/064781 dated Jul. 13, 2018, 18 pages.

Primary Examiner — Daniel Petkovsek
(74) Attorney, Agent, or Firm — Alston & Bird LLP

(57) ABSTRACT

The invention relates to a device comprising:
  a laser source emitting a first beam with a central wavelength $\lambda_1$ lying between 1010 nm and 1050 nm,
  a spectral supercontinuum generator downstream of the laser source, generating a second beam with a central wavelength $\lambda_2$ lying between 1670 nm and 1730 nm from a part of the first beam,
  an optical parametric amplification system downstream of the spectral supercontinuum generator, generating a third beam with a central wavelength $\lambda_3$ lying between
(Continued)

2540 nm and 2690 nm from at least a part of the second beam and a part of the first beam, and a second harmonic generator downstream of the optical parametric amplification system, the second harmonic generator generating a fourth beam with a central wavelength $\lambda_4$ lying between 1270 nm and 1345 nm from at least a part of the third beam.

16 Claims, 3 Drawing Sheets

(51) Int. Cl.
*G02F 1/35* (2006.01)
*H01S 3/00* (2006.01)
*G02F 1/355* (2006.01)
*H01S 3/16* (2006.01)
*G02F 1/37* (2006.01)

(52) U.S. Cl.
CPC ........ *H01S 3/0092* (2013.01); *G01N 21/6458* (2013.01); *G02F 1/3551* (2013.01); *G02F 1/37* (2013.01); *H01S 3/1618* (2013.01)

(58) Field of Classification Search
CPC ....... G02F 2001/3507; G02F 2001/392; G02F 2201/16; G02F 2203/26; H01S 3/0092; G01N 21/6458
See application file for complete search history.

(56) References Cited

U.S. PATENT DOCUMENTS

| 10,522,962 | B2* | 12/2019 | Krausz | H01S 3/2383 |
| 2014/0367591 | A1 | 12/2014 | Mahou et al. | |
| 2016/0064891 | A1 | 3/2016 | Imeshev et al. | |
| 2018/0238738 | A1* | 8/2018 | Alfano | A61K 49/0013 |

* cited by examiner

MULTIPHOTONIC MICROSCOPY METHOD AND DEVICE

CROSS-REFERENCE TO RELATED APPLICATIONS

The present application is a national phase entry of PCT/EP2018/064781, filed on Jun. 5, 2018, which claims the benefit of priority of French Patent Application No. 1755167, filed Jun. 9, 2017, the entire contents of which are hereby incorporated by reference in their entirety for all purposes.

TECHNICAL FIELD

The present invention relates to multiphoton microscopy.

BACKGROUND

Multiphoton microscopy makes it possible to image biological tissues to a certain depth non-invasively with a micrometric three-dimensional resolution. It consists in exciting fluorochromes at a given focal point with several photons simultaneously and scanning the surface to build a 2D or 3D image of the response from the tissue. Multiphoton microscopy is of particular interest in neurosciences.

The depthwise imaging of a biological tissue by a multiphoton microscopy technique is primarily limited by three parameters: a) the absorption of the light by the tissue and primarily by the water contained therein, b) the scattering of the photons in the tissue, and c) the power of the incident beam. These three parameters limit in particular the imaging depth that can be achieved.

Regarding the first point, one of the solutions for limiting the absorption is to choose excitation wavelengths within the ranges of the absorption spectrum that present a reduced absorption coefficient. As can be seen in FIG. 3 representing the absorption spectrum of water, globally, the higher the wavelength, the higher the absorption coefficient of the water. In particular, the water absorbs little between 700 nm and 1000 nm and presents windows around 1300 nm and 1700 nm in which the absorption is reduced.

Regarding the second point, the scattering of the light decreases when the wavelength increases.

Regarding the final point, femtosecond lasers emitting ultrashort pulses of high energy are used.

It is thus known practice to image the biological tissues by multiphoton microscopy using a femtosecond laser emitting ultrashort pulses with a wavelength lying between 700 nm and 1100 nm. This wavelength corresponds to that in which the absorption of the water and of the other constituents of the biological media is lowest. However, the imaging depth remains limited by the scattering of the light in the tissues.

It is also known practice to work with a femtosecond laser emitting ultrashort pulses with a wavelength centered on 1300 nm or 1700 nm, which allows for a gain in depth.

The photochromes that can be accessed by these known techniques are those which are sensitive to an excitation at a wavelength half the wavelength of the incident beam, in the case of 2-photon microscopy, and/or a third of the wavelength of the incident beam, in the case of 3-photon microscopy. That limits the imaging possibilities to a limited choice of photochromes.

There is therefore a need to refine the multiphoton microscopy method and devices.

SUMMARY

The invention addresses this need using a device comprising:

- a laser source emitting a first beam with a central wavelength lying between 1010 nm and 1050 nm,
- a spectral supercontinuum generator downstream of the laser source, generating a second beam with a central wavelength lying between 1670 nm and 1730 nm from a part of the first beam,
- an optical parametric amplification system downstream of the spectral supercontinuum generator, generating a third beam with a central wavelength lying between 2545 nm and 2690 nm from at least a part of the second beam and a part of the first beam, and
- a second harmonic generator downstream of the optical parametric amplification system, the second harmonic generator generating a fourth beam with a central wavelength lying between 1270 nm and 1345 nm from at least a part of the third beam.

Such a device makes it possible, from a single laser source emitting a beam having a central wavelength around 1030 nm, to obtain three beams respectively having central wavelengths around 1030 nm, 1300 nm and 1700 nm. The fact that the three beams are obtained from a single beam guarantees that they are synchronous.

The wavelengths $\lambda_1$, $\lambda_2$ and $\lambda_3$ are linked by the following relationship:

$$\frac{1}{\lambda_1} = \frac{1}{\lambda_3} + \frac{1}{2\lambda_2}$$

For example if $\lambda_1 \approx 1030$ nm and $\lambda_2 \approx 1303$ nm then $\lambda_3 \approx 1703$ nm.

The central wavelengths obtained are situated in the windows of lesser absorption of the water and are scattered little by the tissues, in particular for the beams of highest central wavelength, i.e. around 1300 nm and 1700 nm.

The parametric amplification system makes it possible, from a pump of central wavelength around 1030 nm and a source of central wavelength around 1700 nm, which falls within a window of lesser absorption of water, to generate an additional wavelength around 2600 nm, corresponding to twice 1300 nm, which is also within a window of lesser absorption of water. Thus, it is quite remarkable and novel that a single incident beam of central wavelength around 1030 nm makes it possible, simply, to generate two beams of different central wavelengths both within windows of lesser absorption of water.

The beams can be used separately or in combination. For example, two or three of the beams are combined to image a biological tissue depthwise by multiphoton microscopy. Through the wavelengths and beams that can be used, numerous photochromic excitation possibilities are offered.

Preferably, the first beam has a central wavelength lying between 1020 nm and 1040 nm, even better substantially equal to 1030 nm.

Preferably, the second beam has a central wavelength lying between 1695 nm and 1710 nm, even better substantially equal to 1703 nm.

Preferably, the third beam has a central wavelength lying between 2590 nm and 2620 nm, even better substantially equal to 2606 nm.

Preferably, the fourth beam has a central wavelength lying between 1295 nm and 1310 nm, even better substantially equal to 1303 nm.

Preferably, the first beam is composed of pulse trains each of a duration less than or equal to 500 fs. The fact that the duration of the pulse is very small allows the spectral supercontinuum generator to easily generate the second beam. Indeed, the shorter the duration of the pulses of the first beam, the more the spectrum of the incident beam is widened by the spectral supercontinuum generator.

Preferably, the laser source is an ytterbium-doped fiber laser, the first beam presenting pulse trains of a duration less than or equal to 400 fs and presenting an energy per pulse greater than 40 µJ. Such a laser makes it possible to easily obtain the second beam with the spectral supercontinuum generator and the power of the laser makes it possible to have a high power for the amplification of the second beam in the optical parametric amplification system. Preferably, the device comprises a beam splitter upstream of the spectral supercontinuum generator to split the first beam into two parts, the first part of the first beam making it possible to generate the second beam.

This part of the first beam used for the generation of the second beam presents an energy per pulse lying preferably between 2 µJ and 4 µJ and/or presents a power which represents between 5% and 10% of that of the first beam. For example, the first part of the first beam represents 8% of the initial beam.

Preferably, the spectral supercontinuum generator is a transparent solid material, notably glass, fibers or crystals, or, better, a YAG (yttrium and aluminum garnet) crystal. A YAG crystal makes it possible notably to have a beam path within it which is short, notably of the order of a centimeter, which simplifies the production of a compact device. Furthermore, the YAG crystal, better than a fiber, supports a high power input beam, which is preferentially the case here.

The optical parametric amplification system can comprise at least one optical parametric amplifier.

Preferably, the optical parametric amplification system comprises at least two successive optical parametric amplifiers, the first optical parametric amplifier amplifying said at least a part of the second beam, from the second beam generated by the spectral supercontinuum generator and from a part of the first beam, and the second optical parametric amplifier generating the third beam from at least a part of the second beam amplified by the first optical parametric amplifier and a part of the first beam. The second optical parametric amplifier then has, as input, a part of first beam and a second, high power beam, which allows it to generate a second beam and a third, high power beam. The use of two optical parametric amplifiers makes it possible to have a good amplification efficiency, which makes it possible to have first, second and third beams as output, each of which has a high power.

Preferably, the second optical parametric amplifier has an axial dimension greater than the first optical parametric amplifier, the part of the first beam at the input of the second optical parametric amplifier having a stronger power than that at the input of the first optical parametric amplifier. This makes it possible to increase the efficiency of the optical parametric amplification system.

Preferably, the device comprises a beam splitter upstream of the optical parametric amplification system to split the second part of the first beam into two parts, one of these parts constituting the pump of the first optical parametric amplifier and the other of these parts constituting the pump of the second optical parametric amplifier. For example, the energies are distributed as follows: when the first beam presents an energy per pulse of 40 µJ, the pump of the first amplifier is 4 µJ, which represents approximately 10% of the first beam, and the pump of the second amplifier is 33 µJ, which represents approximately 82% of the first beam.

Preferably, the device comprises at least one stretcher downstream of the spectral supercontinuum generator and upstream of the optical parametric amplification system and at least two compressors downstream of the optical parametric amplification system. Preferably, the compressors and stretchers are composed of glass or crystals. A crystal or a glass make it possible notably to have a short beam path within them, notably of the order of a centimeter. For example, the stretcher is made of silicon. The first compressor makes it possible to compress the second beam and preferably has inverse sign dispersion with respect to the stretcher. The first compressor can be made of silica. The second compressor makes it possible to compress the third beam and, preferably, has dispersion of the same sign as the stretcher. The second compressor is preferably upstream of the second harmonic generator. The second compressor can be made of silicon. The presence of the stretcher, of the optical parametric amplification system and of the compressors makes it possible to have an amplification with low frequency drift, and to reduce the losses and the paths of the beams. The stretcher allows the duration of the pulses of the second beam constituting the signal from the optical parametric amplification system to be tuned to that of the part of the first beam constituting the pump of the optical parametric amplification system and the compressors make it possible, after the optical parametric amplification system, to end up, for the second beam and the third beam, with beams presenting high energy pulse trains.

Preferably, the stretcher makes it possible to have a second beam presenting pulse trains of a duration lying between 200 fs and 400 fs to be adapted to the duration of the first beam.

Preferably, the device comprises at least one stretcher downstream of the spectral supercontinuum generator and upstream of the optical parametric amplification system, a stretcher between the two optical parametric amplifiers and at least two compressors downstream of the optical parametric amplification system, one compressor for the second beam and one compressor for the third beam, preferably upstream of the second harmonic generator.

Preferably, the compressors are configured to substantially offset the stretching or stretchings of the stretcher or stretchers and obtain pulses for the second and third beams of a duration after compression lying between 50 fs and 100 fs, preferably substantially equal to 70 fs.

The optical parametric amplifier or amplifiers can comprise a nonlinear crystal having a second order nonlinear susceptibility and allowing a parametric phase tuning between the first and second beams, preferably a PPLN (Periodically Poled Lithium Niobate), KTA (Potassium Titanyle Arsenate) or BBO (Beta Barium Borate) crystal.

The second harmonic generator can be a nonlinear crystal having a second order nonlinear susceptibility and allowing a frequency-doubling phase tuning of the third beam, preferably an AGS (Silver Thiogallate) or PPLN crystal.

The device can comprise one or more delay lines. Such delay lines make it possible to adjust the phases of the different beams, and obtain synchronous pulses in the optical parametric amplification system and de facto at the output. A first delay line can be situated on the path downstream of the first optical parametric amplifier and makes it possible to tune the wavelength of the second beam amplified in said amplifier. This delay line can be situated on the path of the first beam constituting the pump or of the second beam constituting the signal, preferably on the first beam constituting the pump. The tunability between the pump and the signal is favored by the use of the stretcher which temporally spreads the wavelengths of the second beam. A second delay line can be situated on the path downstream of the second optical parametric amplifier, and makes it possible to optimize the efficiency of said amplifier.

Preferably, the part of the first beam sent as output from the device presents an energy per pulse greater than 0.5 µJ, for example substantially equal to 1.5 µJ.

Preferably, the second beam amplified by the optical parametric amplification system presents pulse trains of a duration lying between 50 fs and 100 fs and an energy per pulse greater than 1 µJ, for example substantially equal to 2.5 µJ.

Preferably, the fourth beam presents pulse trains of a duration lying between 50 fs and 100 fs and an energy per pulse greater than 0.2 µJ, for example substantially equal to 0.4 µJ.

The device can comprise one or more filters making it possible to separate the undesirable wavelengths from the wavelengths wanted at the input or output of certain components of the device. These filters are advantageously dichroic mirrors, which make it possible to allow light to pass at certain wavelengths and to reflect the light at other wavelengths. These dichroic mirrors can be oriented at 45° from the incident beam to be filtered. The device can notably comprise such filters at the output of the first and second parametric amplifiers.

Also a subject of the invention is a multiphoton microscopy imaging method comprising the step of exciting one or more chromophores in a tissue from at least one beam, even better from a combination of beams of central wavelength between 1010 nm and 1050 nm, between 1270 nm and 1345 and/or lying between 1670 nm and 1730 nm, obtained at the output of a device according to the invention, as defined above.

The pulse trains of the different beams are emitted in the tissue synchronously.

It is advantageous to combine the beams obtained at the output of the device. For example, a photochrome can be excited by a photon at 1300 nm and a photon at 1700 nm simultaneously, equivalent to an excitation by a photon at 737 nm, or by a photon at 1300 nm and two photons at 1700 nm simultaneously, equivalent to an excitation by a photon at 514 nm, or by three photons at 1700 nm, equivalent to an excitation by a photon at 567 nm. This makes it possible to widen the field of the photochromes that can be accessed by multiphoton microscopy.

Preferably, the excitation of the photochrome or photochromes is done from a combination of two beams with a central wavelength lying, for one, between 1280 nm and 1320 and lying, for the other, between 1650 nm and 1750 nm.

As a variant, the excitation of the photochrome or photochromes is done from a combination of three beams with a central wavelength lying, for the first, between 1010 nm and 1050 nm, lying, for the second, between 1280 nm and 1320 and lying, for the third, between 1650 nm and 1750 nm.

BRIEF DESCRIPTION OF SEVERAL VIEW(S) OF THE DRAWINGS

The invention will be able to be better understood on reading the following detailed description, of nonlimiting exemplary implementations thereof, and on studying the attached drawing, in which:

FIG. 1 schematically represents a device according to the invention,

DETAILED DESCRIPTION

Device

Figure 1:
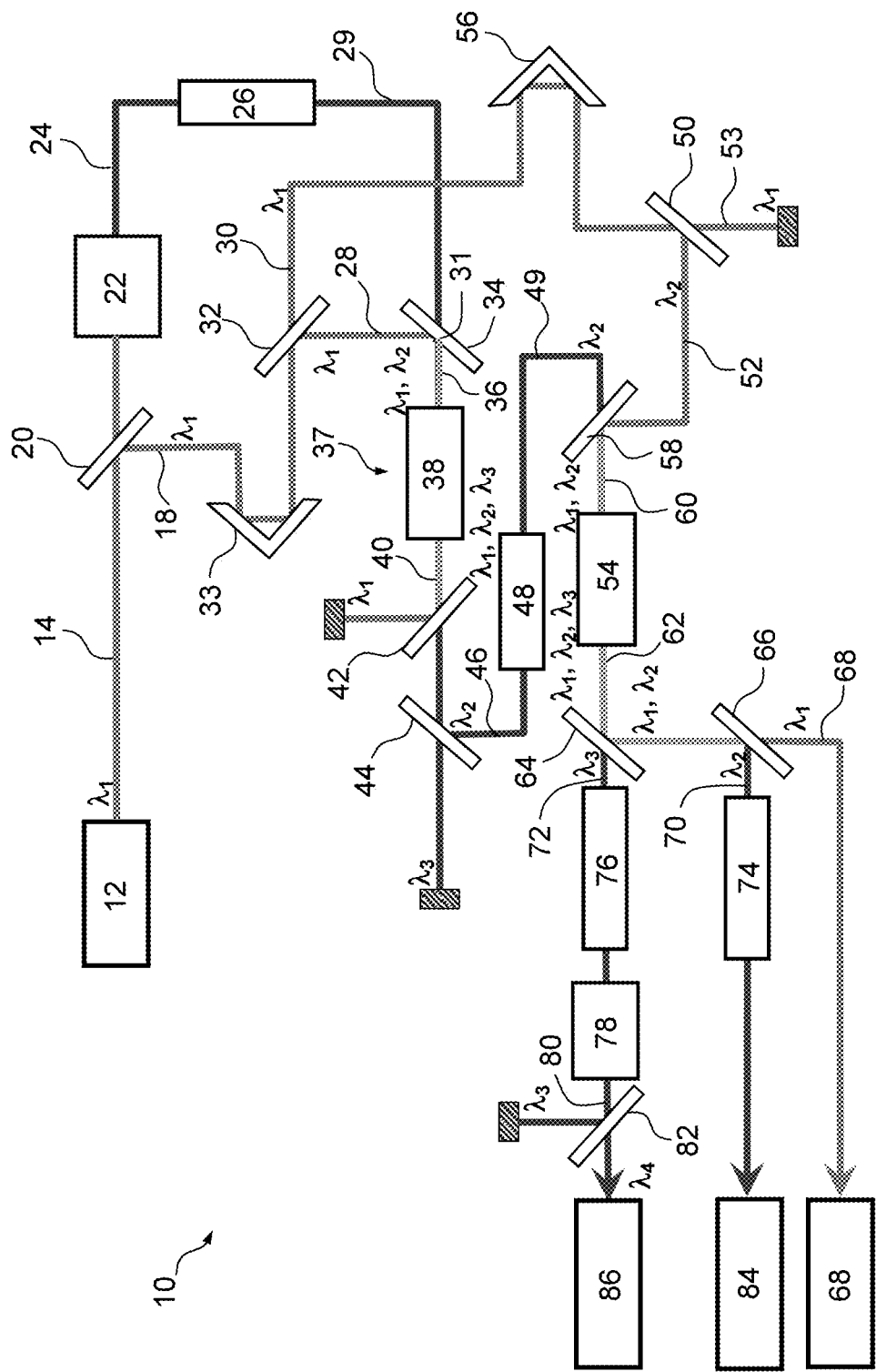

An example of device 10 according to the invention is represented in FIG. 1.

This device 10 comprises a pulsed laser source 12 emitting a beam 14 comprising ultrashort pulse trains with a repetition frequency of approximately 1.25 MHz. The pulses have a central wavelength $\lambda_1$ around 1030 nm and a duration less than or equal to 400 fs, preferably lying between 250 fs and 400 fs, for example substantially equal to 350 fs.

Figure 2:
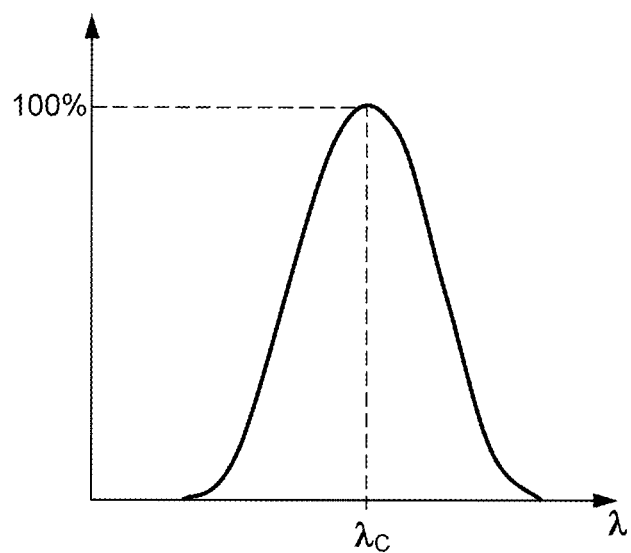
FIG. 2 illustrates the concept of central wavelength, and of a laser beam.

As is illustrated in FIG. 2, the central wavelength $\lambda_c$ is defined by the wavelength for which the maximum spectral intensity of the pulse is reached. The beam 14 is split into two beams 16 and 18 by a splitter 20, for example a semi-transparent mirror disposed at 45° to the incident beam.

The transmitted beam 16 is sent into a spectral supercontinuum generator 22 such as a YAG crystal. The spectral supercontinuum generator 22 delivers as output a beam 24 presenting pulse trains of a duration less than or equal to 100 fs, for example around 70 fs, and a widened wavelength spectrum extending from at least 1030 nm to 1800 nm.

This beam 24 passes through a stretcher 26 so that the duration of the pulse trains of the stretched beam 29 is of a duration lying between 200 fs and 400 fs, being for example substantially equal to 250 fs.

The beam 18 reflected by the splitter 20 is once again split into two beams 28 and 30 by a splitter 32, composed for example of a semi-transparent mirror inclined at 45° to the incident beam.

A delay line 33 is placed on the path of the reflected beam 18 upstream of the splitter 32, being set such that the beam 28 reflected by the splitter 32 and the stretched beam 29 are substantially synchronous.

The beams 28 and 29 are sent to a dichroic mirror 34 oriented at 45° to the incident beam 29.

The dichroic mirror 34 makes it possible to filter in transmission the stretched beam 29 at a central wavelength $\lambda_2$ around 1700 nm into a transmitted beam 31 and to transmit in reflection the beam 28, so as to combine these two beams 28 and 31 into a beam 36 at the input of an optical parametric amplifier 38.

Thus, this beam 36 has a pump component of central wavelength $\lambda_1$ and a signal component of central wavelength $\lambda_2$. The pulse trains of the two components in the beam 36 at the input are synchronous and the pulses have a similar duration.

The optical parametric amplifier 38 generates at the output a beam 40 comprising three components:

a pump component of central wavelength $\lambda_1$, the residue of the beam 28, a signal component of central wavelength $\lambda_2$, and an additional component of central wavelength $\lambda_3$ around:

$$\frac{1}{\frac{1}{1030} - \frac{1}{1700}} \text{ nm}$$

i.e. substantially equal to 2600 nm±10 nm.

The beam 40 is stripped of its central wavelength components $\lambda_1$ and $\lambda_3$ by successive dichroic mirrors 42 and 44 to form a beam 46 having only a single component of central wavelength $\lambda_2$ around 1700 nm.

The mirror 42 rejects, by reflection at 45°, the component $\lambda_1$ and transmits the components $\lambda_2$ and $\lambda_3$. The mirror 44 reflects the component $\lambda_2$ and transmits the component $\lambda_3$.

The beam 46 reflected by the filter 44 passes through a stretcher 48 chosen so that the duration of the pulse trains at the output is between 200 fs and 400 fs, for example substantially equal to 250 fs.

The stretched beam 49 at the output of the stretcher 48 is sent to a dichroic mirror 58 then into an optical parametric amplifier 54.

The mirror 58 is oriented at 45° to the incident beam 49 and transmits it.

The beam 30 transmitted by the splitter 32 is once again divided by a splitter 50 into two beams 52 and 53. Only the reflected beam 52 is retained to be sent to the dichroic mirror 58 then into an optical parametric amplifier 54. The splitter 50 makes it possible to reduce the power of the beam 52.

As is illustrated, a delay line 56 is placed on the path of the beam 30 to the splitter 50, it being set so that the beams 52 and the beam 49 are substantially synchronous at the input of the optical parametric amplifier 54.

The dichroic mirror 58 makes it possible to combine the stretched beam 49 and the beam 52 within a beam 60 at the input of the amplifier 54. This beam 60 therefore has a pump of central wavelength $\lambda_1$ and a signal component of central wavelength $\lambda_3$. The pulse trains of the two components of wavelength $\lambda_1$ and $\lambda_2$ in the beam 60 are synchronous and the pulses have a similar duration.

The optical parametric amplifier 54 generates at the output a beam 62 comprising three components:
- a pump of central wavelength $\lambda_1$, the residue of the beam 28,
- a signal component of central wavelength $\lambda_2$, and
- an additional component of central wavelength $\lambda_3$.

The optical parametric amplifiers 38 and 54 and the stretcher 48, as well as the dichroic mirrors 42, 44, 50 and 58 and the delay line 56 can form part of an integrated parametric amplification system 37.

The three components of the beam 62 at the output of the optical parametric amplifier 54 are split by dichroic mirrors 64 and 66 into three beams 68, 70 and 72 having respective central wavelengths $\lambda_1$, $\lambda_2$ and $\lambda_3$.

The mirror 64 is placed at 45° to the incident beam 62, transmits the component $\lambda_3$ and reflects the components $\lambda_1$ and $\lambda_2$. The mirror 66 is placed at 45° to the incident beam reflected by the mirror 64, transmits the component $\lambda_1$ and reflects the component $\lambda_2$.

The reflected beam 70, of central wavelength $\lambda_2$, is compressed by a compressor 74 so as to offset the effects on the beam 70 of the stretchings performed by the stretchers 26 and 48.

The transmitted beam 72, of central wavelength $\lambda_3$, is sent to a compressor 76 so as to offset the effects on the beam 72 of the stretchings performed by the stretchers 26 and 48 then to a second harmonic generator 78. The latter generates a beam 80 having two components, namely a component having a central wavelength $\lambda_3$, the residue of the compressed beam 72, and a component having a central wavelength $\lambda_4$ that is half of $\lambda_3$, that is to say around 1300 nm.

The beam 80 is filtered of its component of central wavelength $\lambda_3$ by a dichroic mirror 82 placed at 45° to the incident beam 80 and the transmitted beam 86 has only the component of central wavelength $\lambda_4$.

Thus, the device 10 makes it possible to obtain, from a single beam 14 having a central wavelength $\lambda_1$ around 1030 nm, three beams 68, 84 and 86 having central wavelengths $\lambda_1$, $\lambda_2$ and $\lambda_4$ respectively around 1030 nm, 1700 nm and 1300 nm, the three beams obtained having synchronous pulses of repetition frequency of the order of 1.25 MHz.

In an exemplary implementation, a prototype is produced by using as laser source 12 an ytterbium-doped fiber laser presenting pulse trains of an energy greater than or equal to 40 µJ composed of an industrial laser of Satsuma® type from the company Amplitudes System®.

The spectral supercontinuum generator 22 is a YAG crystal.

The stretchers 26 and 38 are silicon crystals of respective thicknesses of approximately 1 mm and 2 mm, or 2 mm and 1 mm.

The optical parametric amplifiers 38 and 54 can each comprise a PPLN crystal. Preferably, the optical parametric amplifier 54 has a greater thickness than the optical parametric amplifier 38 to allow a better efficiency. For example, the optical parametric amplifier 38 is a PPLN crystal of a thickness substantially equal to 1 mm and the optical parametric amplifier 54 is a PPLN crystal of a thickness substantially equal to 3 mm.

The compressor 74 is a sheet of glass of a thickness of approximately 75 mm. The compressor 78 is a silicon crystal of a thickness of approximately 5 mm. The second harmonic generator 78 is an AGS or PPLN crystal.

The delay lines 33 and 56, the beam splitters 20, 32 and 50, and the dichroic mirrors 34, 42, 44, 58, 64, 66 and 82 are of conventional type and are known.

In such a prototype, the power of the beam 16 corresponds to between 5% and 10% of that of the beam 14, that of the beam 28 corresponds to between 5% and 30% of that of the beam 14 and that of the beam 52 corresponds to between 60% and 90% of that of the beam 14.

With such a device, the power of the beam 68 obtained corresponds to between 2% and 20% of that of the beam 14, the beam 84 presents pulse trains of a duration of approximately 65 fs and of an energy greater than 1 µJ and the beam 86 presents pulse trains of a duration of approximately 85 fs and of an energy equal to approximately 0.1 µJ.

Multiphoton Microscopy Method

The beams 68, 84 and/or 86 generated by the device described previously in relation to FIG. 1 can be combined to form a beam having components of central wavelengths $\lambda_1$, $\lambda_2$ and $\lambda_4$.

The beam formed can be used in a multiphoton microscope.

Before the combination of the different beams 68, 84 and/or 86, the latter can each pass or not pass through a delay line making it possible to finely adjust the synchronization of the beams in the case where they might not be totally synchronous at the level of the sample. This can make it possible to compensate the different optical paths of each of these beams between the source and the microscope.

Figure 3:
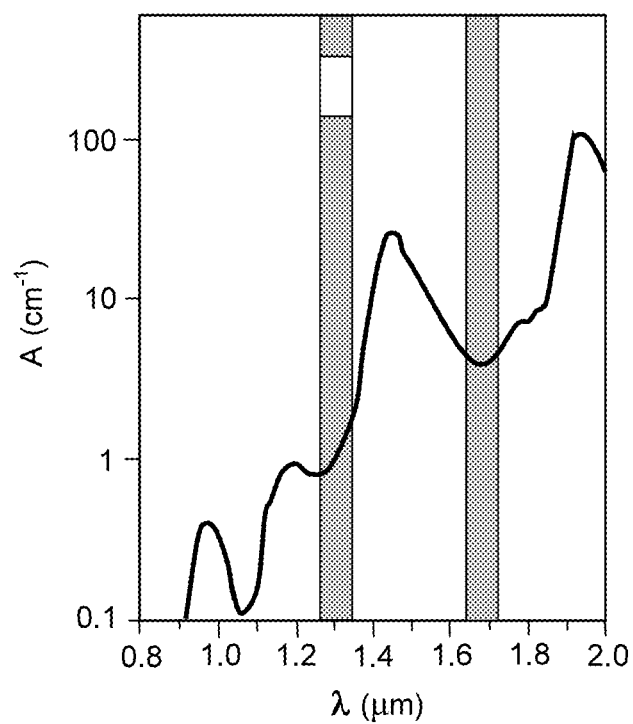
FIG. 3 is an absorption spectrum of water as a function of wavelength.

As is illustrated in FIG. 3, the wavelengths $\lambda_1$, $\lambda_2$ and $\lambda_4$ are situated in the windows of lesser absorption of water, and offer a good penetration into the tissues, which makes it possible to excite fluorochromes at depth.

This excitation can be done with one or more simultaneous photons of the same wavelength or of different wavelengths.

For example, in the case where the excitation is performed by two simultaneous photons of wavelengths $\lambda_i$ and $\lambda_j$, the excitation is equivalent to that of two photons of the same wavelength:

$$\frac{2}{\frac{1}{\lambda i} + \frac{1}{\lambda j}} \, nm$$

For example, in the case where the excitation is performed by three simultaneous photons of wavelengths $\lambda_i$ and $\lambda j$, that is to say of which at least two photons are of the same wavelength, the excitation is equivalent to that of three photons of the same wavelength:

$$\frac{3}{\frac{2}{\lambda i} + \frac{1}{\lambda j}} \, nm \quad or \quad \frac{3}{\frac{1}{\lambda i} + \frac{2}{\lambda j}} \, nm$$

By way of example, different combinations of excitation with two photons of wavelengths $\lambda_1$, $\lambda_2$ or $\lambda_4$ or three photons of wavelength $\lambda_1$, $\lambda_4$ or $\lambda_2$ are realized in Tables 1 and 2 below. The equivalent wavelength is indicated each time.

TABLE 1

Two-photon excitation with one or two colors out of $\lambda_1 = 1030$, $\lambda_4 = 1300$, $\lambda_2 = 1700$ nm.

|  | Photon 1, photon 2 (nm) | | | | | |
|---|---|---|---|---|---|---|
|  | 1030, 1030 | 1030, 1300 | 1300, 1700 | 1300, 1300 | 1300, 1700 | 1700, 1700 |
| Equivalent photon for a 2-photon excitation (nm) | 1030 | 1149 | 1283 | 1300 | 1473 | 1700 |
| Equivalent photon for a 1-photon excitation (nm) | 515 | 574 | 641 | 650 | 736 | 850 |

TABLE 2

Three-photon excitation with two colors ($\lambda_1 = 1030$ nm, $\lambda_4 = 1700$ nm).

|  | Photon 1, photon 2, photon 3 (nm) | | | |
|---|---|---|---|---|
|  | 1030, 1030, 1030 | 1030, 1030, 1700 | 1030, 1700, 1700 | 1700, 1700, 1700 |
| Equivalent photon for a 3-photon excitation (nm) | 1030 | 1186 | 1397 | 1700 |
| Equivalent photon for a 1-photon excitation (nm) | 343 | 395 | 466 | 567 |

TABLE 3

Three-photon excitation with two colors ($\lambda_4 = 1300$ nm, $\lambda_2 = 1700$ nm).

|  | Photon 1, photon 2, photon 3 (nm) | | | |
|---|---|---|---|---|
|  | 1300, 1300, 1300 | 1300, 1300, 1700 | 1300, 1700, 1700 | 1700, 1700, 1700 |
| Equivalent photon for a 3-photon excitation (nm) | 1300 | 1411 | 1542 | 1700 |
| Equivalent photon for a 1-photon excitation (nm) | 433 | 470 | 514 | 567 |

Similar tables can be effected for an excitation with four photons, and so on.

The number of equivalent wavelengths achievable is much greater in the context of the invention than in the context of an excitation with several simultaneous photons of the same wavelength.

These equivalent wavelengths range in the invention from the visible to the infrared.

The multiphoton microscopy as described above therefore makes it possible to excite a greater diversity of photochromes emitting from the visible to the infrared and to obtain images of tissues with multiple contrasts as a function of excited photochromes.

An example of use of the beams obtained to perform multicolor microscopy is described below.

Example

Beams of central wavelengths $\lambda_2$, substantially equal to 1700 nm, and $\lambda_4$, substantially equal to 1300 nm, are obtained simultaneously using the device as described in relation to FIG. 1.

These beams are sent simultaneously to a sample of fluorescence-marked chicken embryo spinal cord.

Several images are obtained simultaneously.

Figure 4A:
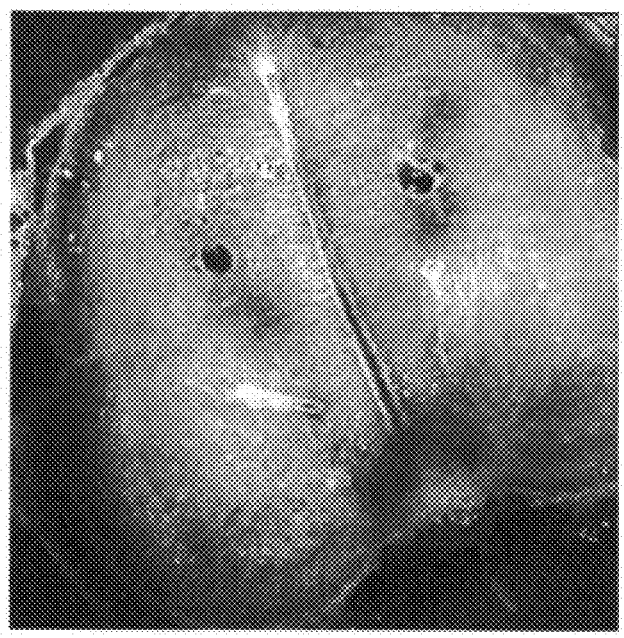
FIG. 4A is an image of a tissue obtained by third harmonic generation.

The photons of wavelength $\lambda_4$ make it possible to generate a first image, illustrated in FIG. 4A, obtained by third harmonic generation allowing visualization of the morphology of the tissue without fluorescence.

The photons of wavelength $\lambda_4$ make it possible also to generate a second image obtained by 3-photon microscopy, in which the excited fluorochromes re-emit in the green.

The photons of wavelength $\lambda_2$ make it possible to generate a third image obtained by 3-photon microscopy, in which the excited fluorochromes re-emit in the red.

Figure 4B:
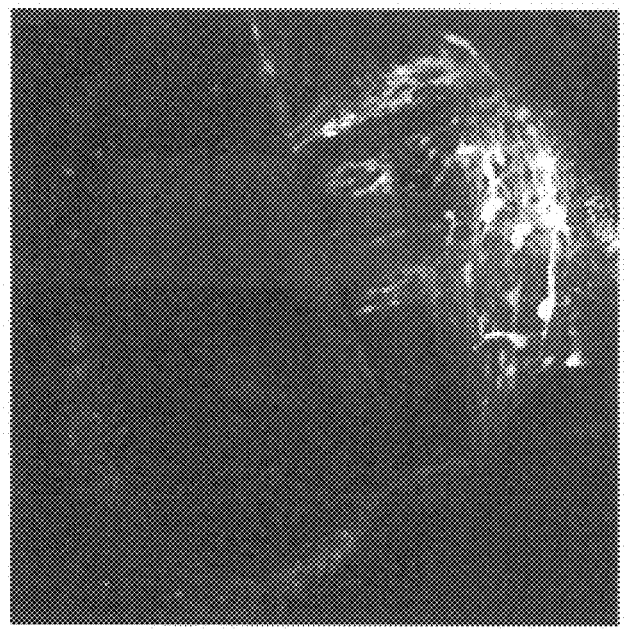
FIG. 4B is an image of the tissue of FIG. 4A obtained by 3-photon microscopy.

The second and third images are combined in FIG. 4B to form a single image in two colors.

The device according to the invention therefore makes it possible to generate beams of different wavelengths that can be used together to produce the multiphoton imaging. It is then possible to simultaneously obtain images of different colors that can be superposed.

The invention claimed is:

1. A device comprising:
    a laser source emitting a first beam with a central wavelength $\lambda 1$ lying between 1010 nm and 1050 nm,
    a splitter downstream of the laser source to create a least a transmitted first beam and a reflected beam,
    a spectral supercontinuum generator downstream of the laser source and configured to receive the transmitted first beam and generate at least a spectrally broadened first beam from a part of the transmitted first beam, a spectral filter to filter said spectrally broadened first beam and form a second beam with a central wavelength λ2 lying between 1670 nm and 1730 nm, an optical parametric amplification system downstream of the spectral supercontinuum generator, said optical parametric amplification system comprising;
- a first optical parametric amplifier configured to amplify at least a part of said second beam and said reflected beam, and
- a second optical parametric amplifier configured to generate a third beam with a central wavelength $\lambda_3$ lying between 2540 nm and 2690 nm, and a harmonic generator downstream of the optical parametric amplification system, the harmonic generator generating a fourth beam with a central wavelength $\lambda_4$ lying between 1270 nm and 1345 nm from at least a part of the third beam.

2. The device as claimed in claim 1, the first beam having a central wavelength $\lambda_1$ lying between 1020 nm and 1040 nm.

3. The device as claimed in claim 1, the second beam having a central wavelength $\lambda_2$ lying between 1695 nm and 1710 nm.

4. The device as claimed in claim 1, the third beam having a central wavelength $\lambda_3$ lying between 2590 nm and 2620 nm.

5. The device as claimed in claim 1, the fourth beam having a central wavelength $\lambda_4$ lying between 1295 nm and 1310 nm.

6. The device as claimed in claim 1, the first beam being composed of pulse trains of a duration less than or equal to 500 fs.

7. The device as claimed in claim 1, the laser source being an ytterbium-doped fiber laser, the first beam presenting pulses of a duration less than or equal to 400 fs and presenting an energy per pulse greater than 40 µJ.

8. The device as claimed in claim 1, the spectral supercontinuum generator being a fiber with nonlinear effect.

9. The device as claimed in claim 1, the second optical parametric amplifier having an axial dimension greater than the first optical parametric amplifier, the beam at the input of the second optical parametric amplifier having a stronger power than that at the input of the first optical parametric amplifier.

10. The device as claimed in claim 1, comprising at least one stretcher downstream of the spectral supercontinuum generator and upstream of the optical parametric amplification system and at least two compressors downstream of the optical parametric amplification system, a first compressor for compressing the second beam and a second compressor for compressing the third beam.

11. The device as claimed in claim 1, comprising at least one stretcher downstream of the spectral supercontinuum generator and upstream of the optical parametric amplification system, a stretcher between the two optical parametric amplifiers, and at least two compressors downstream of the optical parametric amplification system, with one compressor for the second beam and one compressor for the third beam.

12. The device as claimed in claim 1, at least one of the optical parametric amplifiers further comprising a nonlinear crystal having a second order nonlinear successability and allowing a parametric phase tuning between the first and second beams.

13. The device as claimed in claim 1, the harmonic generator being a nonlinear crystal having a second order nonlinear successability and allowing a frequency-doubling phase tuning of the third beam.

14. The device of claim 1 which further comprises a method of using said device to generate at least one beam of central wavelength between 1010 nm and 1050 nm, between 1280 nm and 1345, and between 1670 nm and 1730 nm to excite one or more chromophores in a tissue.

15. The device of claim 1 which further comprises a method of using said device to generate a combination of two beams with a central wavelength lying, for one, between 1280 nm and 1345 nm and lying, for the other, between 1670 nm and 1730 nm.

16. The device of claim 1 which further comprises a method of using said device to generate a combination of two beams with a central wavelength lying, for the first, between 1010 nm and 1050 nm, lying, for the second, between 1270 nm and 1345 nm and lying, for the third, between 1670 nm and 1730 nm.

* * * * *